US012561627B2

(12) United States Patent
Fahham et al.

(10) Patent No.: US 12,561,627 B2
(45) Date of Patent: *Feb. 24, 2026

(54) OIL FIELD RESOURCE ALLOCATION USING MACHINE LEARNING AND OPTIMIZATION

(71) Applicant: Schlumberger Technology Corporation, Sugar Land, TX (US)

(72) Inventors: Abdulfattah Fahham, Dhahran (SA); Richard Booth, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 79 days.

This patent is subject to a terminal disclaimer.

(21) Appl. No.: 18/412,642

(22) Filed: Jan. 15, 2024

(65) Prior Publication Data

US 2024/0152831 A1 May 9, 2024

Related U.S. Application Data

(63) Continuation of application No. 17/250,036, filed as application No. PCT/US2019/029765 on Apr. 30, 2019, now Pat. No. 11,887,031.

(60) Provisional application No. 62/670,524, filed on May 11, 2018.

(51) Int. Cl.
| | |
|---|---|
| *G06Q 10/00* | (2023.01) |
| *G06N 20/00* | (2019.01) |
| *G06Q 10/0631* | (2023.01) |
| *G06Q 50/02* | (2012.01) |

(52) U.S. Cl.
CPC ..... *G06Q 10/063116* (2013.01); *G06N 20/00* (2019.01); *G06Q 10/06313* (2013.01); *G06Q 50/02* (2013.01)

(58) Field of Classification Search
None
See application file for complete search history.

(56) References Cited

U.S. PATENT DOCUMENTS

| | | | |
|---|---|---|---|
| 9,489,630 B2 * | 11/2016 | Achin | .................. G06Q 10/067 |
| 11,053,789 B2 | 7/2021 | Maher | |
| 11,887,031 B2 | 1/2024 | Fahham | |

(Continued)

FOREIGN PATENT DOCUMENTS

| | | |
|---|---|---|
| RU | 2614512 C2 | 3/2017 |
| WO | 2004099917 A2 | 11/2004 |
| WO | 2009012439 A1 | 1/2009 |

OTHER PUBLICATIONS

Parshall, Joel, Machine Learning Can Enhance and Add Jobs, Jun. 30, 2018, Journal of Petroleum Technology, https://jpt.spe.org/machine-learning-can-enhance-and-add-jobs, p. 1-6. (Year: 2018).*

*Primary Examiner* — Joseph M Waesco
(74) *Attorney, Agent, or Firm* — Jeffrey D. Frantz

(57) ABSTRACT

Oil field resources are allocated using machine learning and optimization. A well of a set of wells is identified. A user interface is presented to obtain a priority of a set of priorities. A schedule is generated for a set of resources for a job using the priority. A job schedule is presented that includes a set of jobs for the set of wells. The job schedule is generated using the set of priorities. An update to the priority is obtained. An updated job schedule is presented based on the update to the priority.

16 Claims, 12 Drawing Sheets

(56)     References Cited

U.S. PATENT DOCUMENTS

| | | | |
|---|---|---|---|
| 2009/0119126 A1* | 5/2009 | Johnson | G06Q 10/06 |
| | | | 705/2 |
| 2014/0067745 A1* | 3/2014 | Avey | G06Q 10/04 |
| | | | 706/46 |
| 2014/0136443 A1* | 5/2014 | Kinsey, II | G06Q 10/063116 |
| | | | 705/347 |
| 2014/0278689 A1 | 9/2014 | Agarwal et al. | |
| 2015/0294258 A1* | 10/2015 | Hildebrand | E21B 45/00 |
| | | | 705/7.15 |
| 2015/0354336 A1* | 12/2015 | Maurice | G06Q 50/02 |
| | | | 700/275 |
| 2017/0002630 A1* | 1/2017 | Priezzhev | E21B 43/12 |
| 2017/0004430 A1* | 1/2017 | Auradkar | G06Q 10/06313 |
| 2017/0243140 A1* | 8/2017 | Achin | G06F 9/5011 |
| 2017/0364795 A1* | 12/2017 | Anderson | G06N 20/10 |
| 2018/0107987 A1* | 4/2018 | MacKenzie | G06F 16/24578 |
| 2018/0171774 A1* | 6/2018 | Ringer | E21B 47/002 |
| 2018/0181876 A1* | 6/2018 | Zhuo | G01N 33/1886 |
| 2019/0024494 A1* | 1/2019 | Maher | E21B 43/006 |
| 2020/0302293 A1* | 9/2020 | Liu | G05B 19/4155 |
| 2022/0404815 A1* | 12/2022 | Chubanov | G06Q 50/04 |
| 2023/0102494 A1* | 3/2023 | Meghani | G06N 3/092 |
| | | | 705/7.23 |
| 2024/0152831 A1* | 5/2024 | Fahham | G06N 20/00 |

* cited by examiner

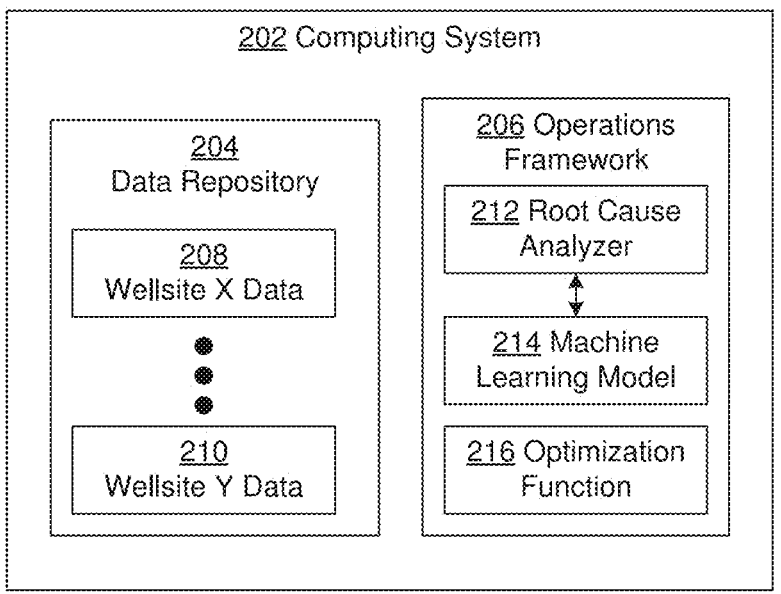
_FIG. 2_

START

Obtain well data of well of set of wells — Block 402

Obtain indication of issue with the well with machine learning model — Block 404

Identify job to address issue — Block 406

Identify resource for job — Block 408

Update schedule for resources based on update to priority — Block 410

END

Process 400

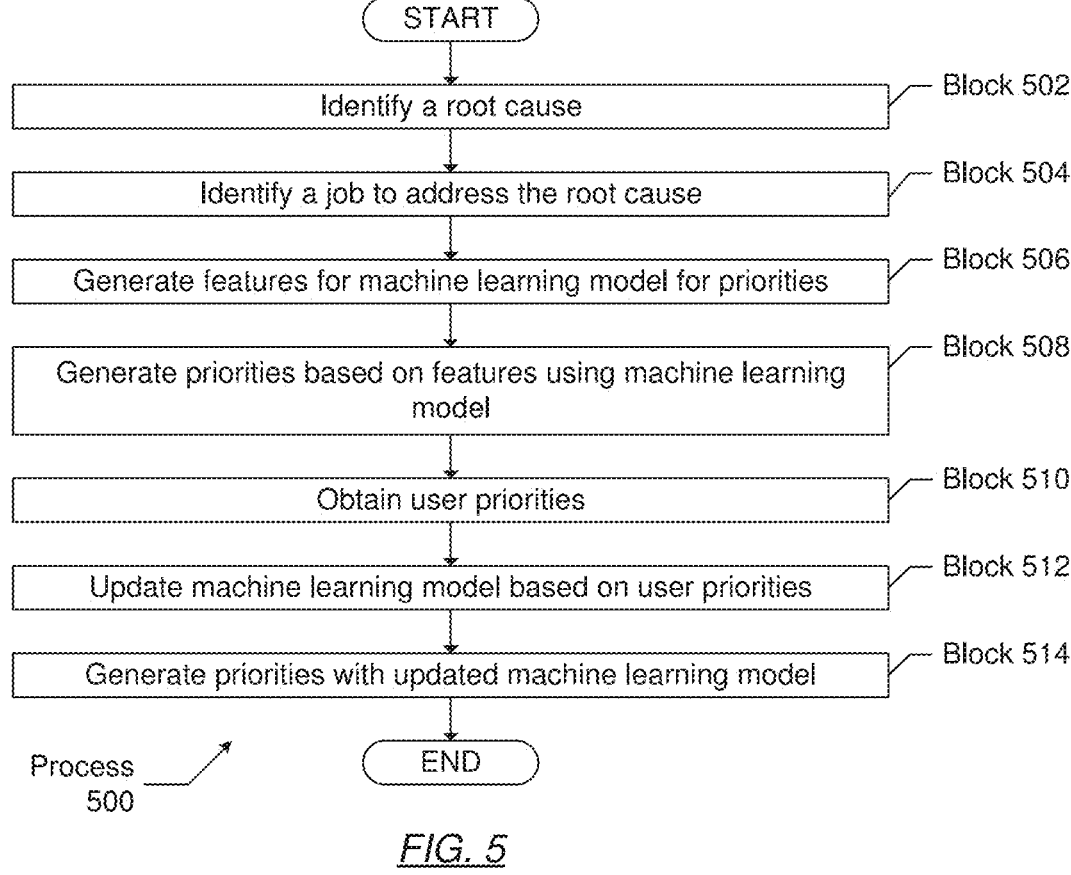

START

Identify a root cause — Block 502

Identify a job to address the root cause — Block 504

Generate features for machine learning model for priorities — Block 506

Generate priorities based on features using machine learning model — Block 508

Obtain user priorities — Block 510

Update machine learning model based on user priorities — Block 512

Generate priorities with updated machine learning model — Block 514

END

Process 500

| | 812 | 814 | 816 |
|---|---|---|---|
| W2 | Pump failure | Replace pump | |
| W1 | Water coning | Cement bottommost | |
| W3 | Inflow performance | Matrix stimulation | |
| W2 | Insufficient lift (in 1 yr.) | Resize pump | |
| W2 | Water coning (in 1 yr.) | Cement bottommost | 818 |

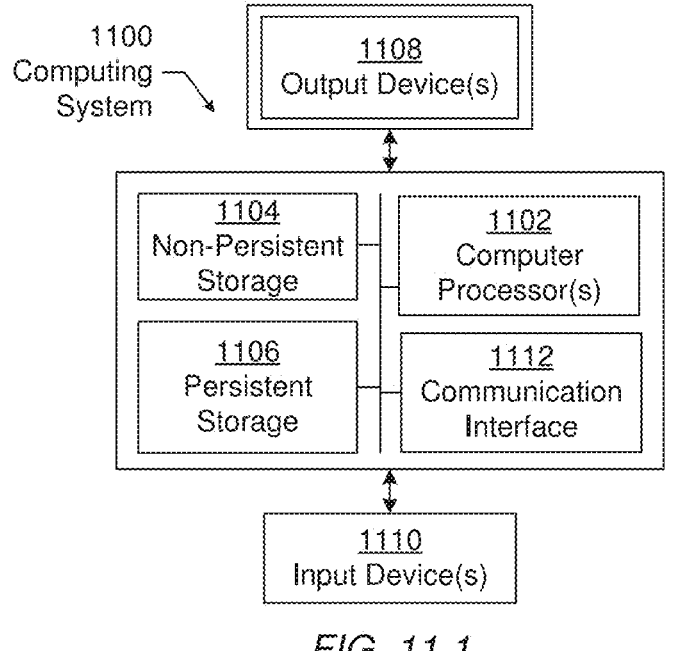
*FIG. 11.1*
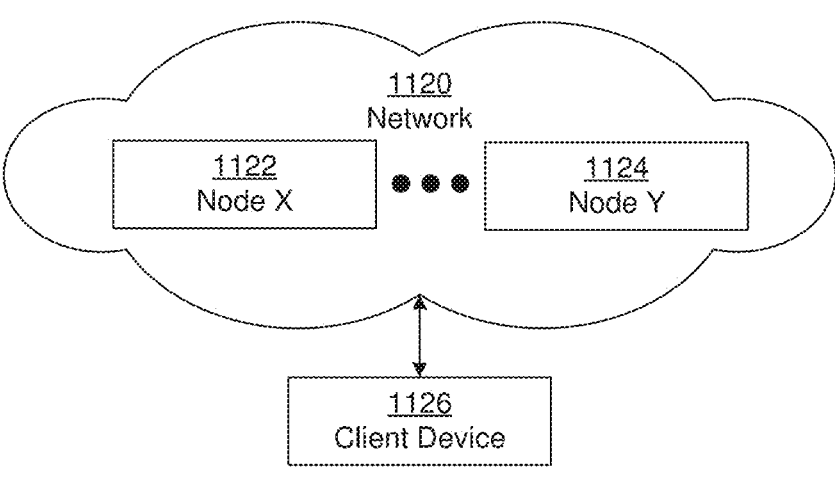
*FIG. 11.2*

OIL FIELD RESOURCE ALLOCATION USING MACHINE LEARNING AND OPTIMIZATION

CROSS-REFERENCE TO RELATED APPLICATION

This application is a continuation and claims the benefit of and priority to U.S. application Ser. No. 17/250,036 with a 371(c) date of 10 Nov. 2020, published as US2021/0166184, now U.S. Pat. No. 11,887,031, which is a national stage of international application No. PCT/US2019/029765 filed on 30 Apr. 2019, which claims priority to and the benefit of U.S. provisional application Ser. No. 62/670,524, filed May 11, 2018, all of which are incorporated herein by reference in its entirety.

BACKGROUND

Exploration and production services include managing the performance of jobs on wells that may be underperforming. The jobs may use several resources including equipment and personnel to be properly scheduled without conflicts. Different jobs have different priorities that affect the allocation and scheduling of resources for jobs. Additionally, different clients that confirm whether a job will be performed have different criteria for confirming the performance of jobs. A challenge is to prioritize and schedule jobs and resources that is acceptable to clients and properly allocates resources.

SUMMARY

In general, in one or more aspects, the disclosure relates to oil field resource allocation using machine learning and optimization. A well of a set of wells is identified. A user interface is presented to obtain a priority of a set of priorities. A schedule is generated for a set of resources for a job using the priority. A job schedule is presented that includes a set of jobs for the set of wells. The job schedule is generated using the set of priorities. An update to the priority is obtained. An updated job schedule is presented based on the update to the priority.

Other aspects of the disclosure will be apparent from the following description and the appended claims.

BRIEF DESCRIPTION OF DRAWINGS

FIG. 2 shows a diagram of a system in accordance with disclosed embodiments.

FIG. 11.1 and FIG. 11.2 show computing systems in accordance with disclosed embodiments.

DETAILED DESCRIPTION

Figure 1:
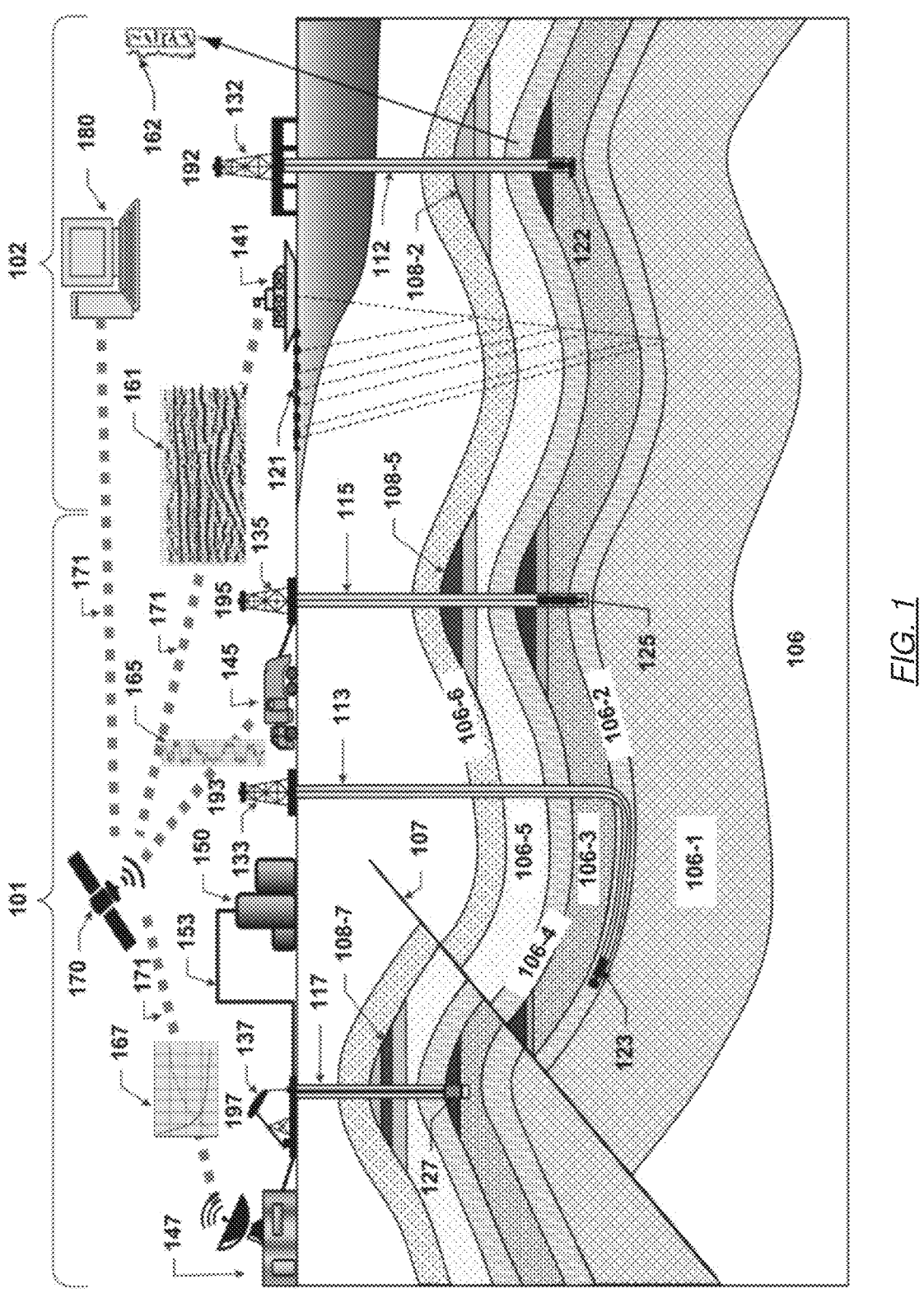
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments are directed to identifying a root cause of an oilfield problem. The root cause may be a predicted future failure. Based on the root cause, various actions may be performed. For example, one or more embodiments may create an automated operation scheduler that can be eventually deployed on production and operations as a field task prioritization by using domain models, predictive modeling, third party logistics and historical data to determine time to accomplish a job. A link is created between domain models to predict failure proactively from machine learning algorithms. Then, one or more embodiments may send insights to different segments, operation delivery managers in the field and the sales department. Targeted marketing campaigns may be deployed to clients and help with the logistics preparation as the jobs are planned.

In the oilfield, both office and field have a different set of properties. The office team is often focused on identification of problems in the network and asset management. The focus is to maintain cash flow while minimizing network risk. Meanwhile, the field crew is focused on finishing the jobs, communication with third parties, supply chain management, and crew scheduling. Therefore, one or more embodiments is directed to an operation scheduler that can link office and field to ensure that priorities of both are considered when scheduling jobs.

First, existing domain workflows monitor the overall network and identify and alert of possible problems in the field, e.g. increased watercut.

Second, through root cause analysis, using knowledge gathered from multiple domains, data analytics and machine learning algorithms can provide the list of probable causes. Each cause may have several appropriate remedies and further analytics indicates the most impactful remedy for the issue based on expected cashflow and cost benefit analysis.

Third, the office prioritizes jobs based on expected cashflow, current budget, and operational risk. While the office has their own priority, in the field, certain jobs may use additional time to gather equipment or contract third parties. Crew location, availability and time of travel also impact the time to start the job. Equally the job duration may impact the order in which jobs are most efficiently completed.

Fourth, combining the job priorities assigned by the office and realities of the field work involved, a dynamically automated scheduler is used to provide the most efficient timeline to perform the jobs.

Fifth, the process is iterative. The identification of most probable causes, most impactful remedies and the estimation of job duration may be improved with time as more data is gathered. The continual improvement of machine learning algorithms combined with the proactively scheduling jobs, issues may be predicted and corrected before an impact is even felt.

Turning now to the Figures, FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of E&P operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 11.1 and 11.2 and described below.

FIG. 2 is an example diagram of a system in accordance with one or more embodiments of the invention. As shown in FIG. 2, the system includes a computing system (202). The computing system may be a computing system such as described below with reference to FIGS. 11.1 and 11.2. For example, the computing system may be the E&P computer system described in reference to FIG. 1. The computing system (202) may include a data repository (204) that is communicatively connected to operations framework (206). The data repository (204) is any type of storage unit or device that includes functionality to store data. In one or more embodiments, the data repository (204) includes functionality to store well data (e.g., well X data (208), well Y data (210)). The well data may be any data described above with reference to FIG. 1. For example, the well data may be static data, dynamically updated data, such as a data stream, or any other data collected from the various equipment at the oilfield. The well data may further include modeled data or data generated using modeling or simulation tools.

The operations framework (206) is hardware and/or software that includes functionality to monitor and/or control operations of the oilfield. The operations framework (206) includes a root cause analyzer (212), a machine learning model (214), and an optimization function (216). The root cause analyzer (212) includes functionality to use the well data and the machine learning model (214) to perform a root cause analysis. Based on the root cause data, one or more jobs may be identified. A job is a defined set of tasks to modify the physical equipment and/or the computing equipment at one or more wellsites of the oilfield. For example, the job may be to replace a drill bit, replace a component of the drill string, remove a faulty pipe, change a pump, or perform another set of tasks. The job may be defined to correct a failure or a predicted failure of the oilfield drilling, production, or completion operations. A job involves the use of one or more resources. The resources are the equipment and individuals used to perform the job. Resources may be shared between jobs, between companies, and between wellsites at a field. The optimization function (216) is an objective function with constraints. When executed, the operations framework using the optimization function includes functionality to use the data in the data repository (204) to perform resource scheduling and to perform service based on root cause analysis.

In general, machine learning algorithms predict the failure in the oilfield. Machine learning models may further be used to predict a schedule of jobs to address the failure. Then the vendor can preschedule the service or plan on the failure occurring at the customer wellsite. The customer may request resources, such as a crew to show up at the wellsite and fix the problem immediately. Using one or more embodiments, because the failure can be predicted, the logistics can be predicted. One or more embodiments performs scheduling and predicts the future outcome. Thus, logistics before failure may be analyzed. Further, one or more embodiments perform global optimization of net present value across the wells of the system.

Figure 3:
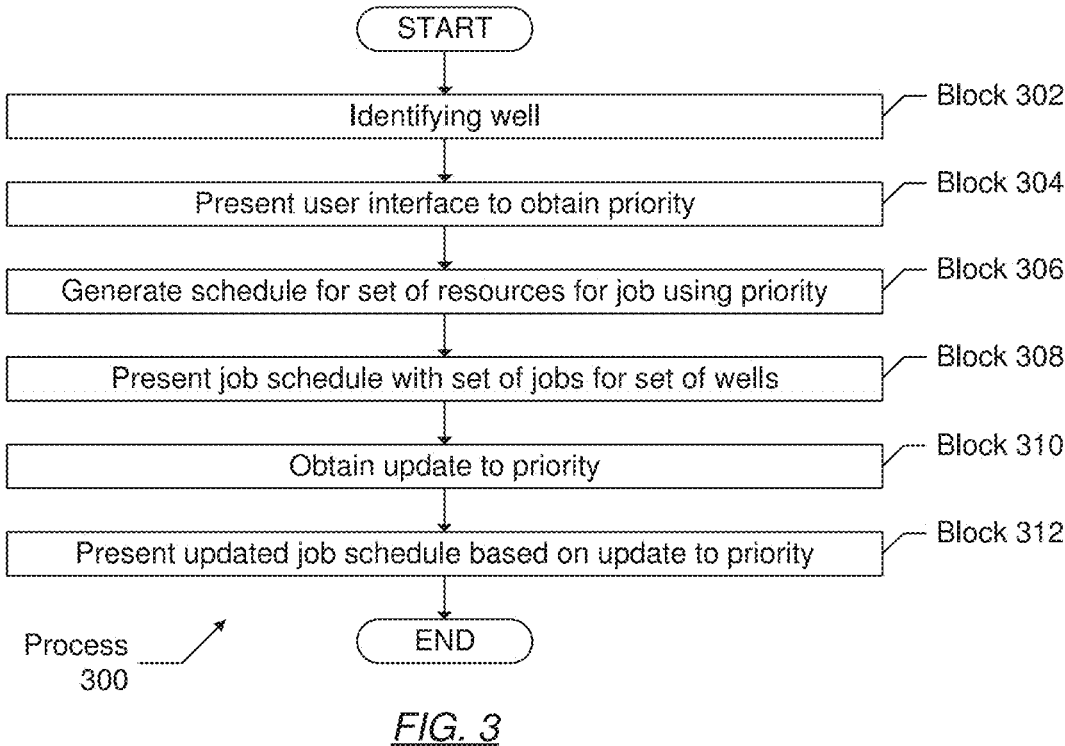
FIG. 3, FIG. 4, and FIG. 5 show flowcharts in accordance with disclosed embodiments.

FIG. 3 shows a flowchart in accordance with one or more embodiments of the disclosure. While the various blocks in the flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

In Block 302, a well is identified. In one or more embodiments, the well is identified with a graphical user interface. In one or more embodiments, the graphical user interface displays a map with markers that indicate the geographic locations of the wells on the map.

In Block 304, a user interface is presented to obtain a priority. In one or more embodiments, the user interface is a graphical user interface that includes an overhead view of a set of wells. A well may have one or more jobs identified to address root causes of issues at the well. The jobs and wells may be displayed in a tabular format in a jobs table with rows that identify a well and a job. The ordering of the jobs within the table identifies the priorities of the jobs. In one or more embodiments, the order of the priorities for the jobs and wells presented in the graphical user interface is determined using a machine learning model. An example of using and applying the machine learning model to determine the priority of jobs is discussed below with reference to FIG. 5.

In Block 306, a schedule is generated for the set of resources for a job for the well using the priority. In one or more embodiments, the job being scheduled has a higher priority than other jobs. Thus, shared resources are assigned to the job being scheduled with higher priority before being assigned to other jobs of lower priority.

In Block 308, a job schedule is presented that includes the jobs for the wells. In one or more embodiments, the job schedule is generated at a server and transmitted to a client device, which displays the job schedule. The jobs on the job schedule include the jobs for the wells that are presented on the map and then prioritized. In one or more embodiments, the jobs on the job schedule include a confirmation indication that indicates whether a job is confirmed. When a job is confirmed, the confirmation indication may have a value of 100% and display the text "confirmed". When a job has not been confirmed, the confirmation indication may display the percentage probability of the expectation that the job will be confirmed, also referred to as a client confirmation probability. In one or more embodiments, the expectation that the job will be confirmed is generated with a machine learning model and based on the resources used for the jobs, the scheduling of the jobs, and the priorities of the jobs.

In Block 310, an update to a priority of a job for a well is obtained. In one or more embodiments, after viewing the job schedule, a user of the system transitions back to the user interface that presents the priorities for the jobs. In one or more embodiments, the user reorders the jobs in the jobs table to adjust the priorities of the jobs. In one or more embodiments, the jobs table includes a dividing line so that jobs above the dividing line have a higher priority than jobs below the dividing line, which may be in addition to the priority derived from the order of jobs in the table.

In Block 312, an updated job schedule is presented based on an update to a priority. In one or more embodiments, after updating the priority of a job, the user transitions back to the job schedule user interface. In response to the changes to the priorities of the jobs of the wells, the system reschedules the resources for the jobs, updates the confirmation indications, and updates the job schedule. As an example, if two jobs at different wells use the same resource at the same time, then the confirmation indication may have a low expectation on the order of 10% for each job. After adjusting the priorities of the jobs, the resource may be rescheduled for the jobs at different times and the probability of the confirmation indication may include a corresponding increase for one or both of the jobs to around 50%.

Figure 4:
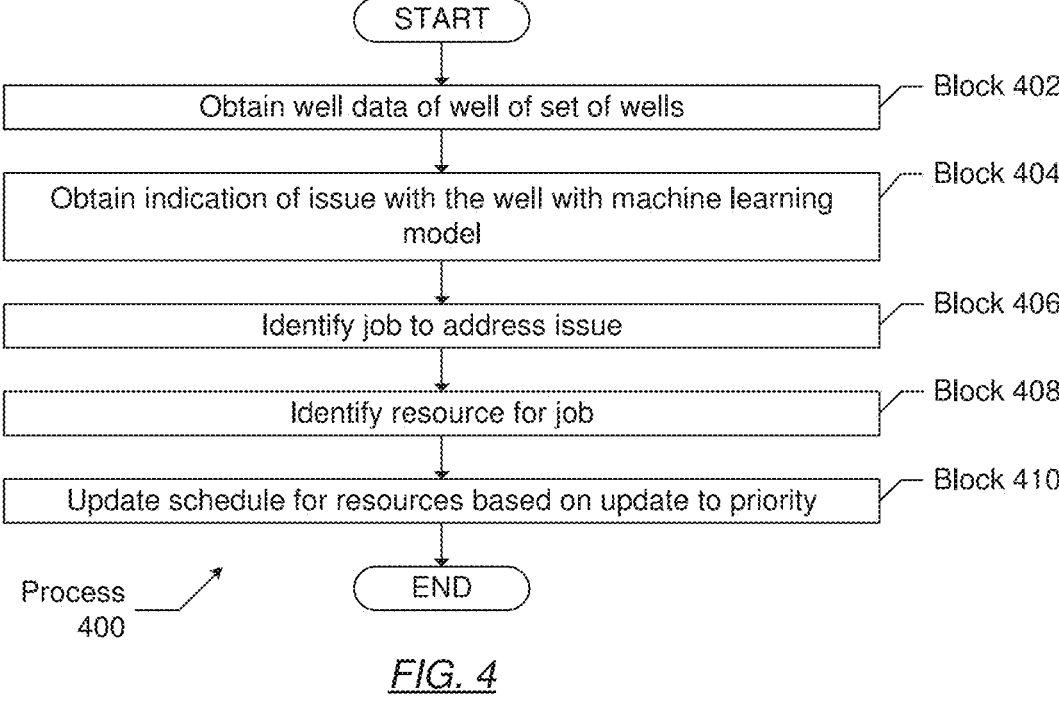

FIG. 4 shows a flowchart in accordance with one or more embodiments of the disclosure. While the various blocks in the flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

In Block 402, well data is obtained from a set of wells. In one or more embodiments, the well data is obtained as described in FIG. 1 and collected by an E&P computer system, which may be a cloud-based computing system.

In Block 404, an indication of an issue with a well is obtained with a machine learning model. In one or more embodiments, the issue may be generated from and raised with a data driven domain model (e.g., from running production software) and is combined with the machine learning model. In one or more embodiments, the machine learning model confirms the issue raised by the data driven domain model. In one or more embodiments, the E&P computer system includes the machine learning model as one of a set of machine learning models. The machine learning models are applied to the data to generate indications of issues with the wells. Different machine learning models may identify different types of issues with the wells. As an example, a first machine language model predicts issues related to high water production from features generated from the well data received from a well, as further described below. As another example, a second machine learning model predicts issues related to production shortfall from features generated from the well data received from a well. In one or more embodiments, the machine learning model includes one or more fully connected neural networks, convolutional neural networks, recurrent neural networks, long short term memory, etc.

In Block 406, a job is identified to address an issue. A machine learning and a domain model may be used to evaluate the list of different remedies and their overall impact on the network. The machine learning model may be used in combination with or as a confirmation of the data driven domain model. In one or more embodiments, the job is specified with a job definition language that identifies the resources, including the equipment, people, time, and scheduling for performing the job. Addressing an issue may involve multiple activities or tasks to complete a job. For example, the job of replacing an electric submersible pump may include the activity of pulling a pump from the well and then replacing the pump with a new pump. These separate activities may use different resources (i.e., different equipment, people, time, and scheduling). In one or more embodiments, the job is identified with a machine learning model that uses features extracted from the well data as well as the outputs from the machine learning models that identify the potential issues with the wells.

In Block 408, a resource is identified for a job. In one or more embodiments, after identifying a job with a likelihood of successfully addressing the issue that is greater than the likelihoods of success of other potential jobs, the resources used for the identified job are then identified and may be presented to a user of the system.

In Block 410, after an update to a priority, a schedule for resources is updated based on the updated priority. In one or more embodiments, a priority of a current job is updated by a user and resources for the current job are rescheduled based on the updated priority. The schedule, which may have been previously presented to the user, is updated to reflect the new priority. As an example, when the priority is increased for the current job, resources that had been previously allocated to different jobs may be allocated to the current job instead of being allocated to the different jobs and may reduce the time for completing the current job. As another example, when the priority is decreased for the current job, other different jobs may be allocated a resource before the current job is allocated the resource to lengthen or delay the scheduling of the completion of the current job.

Figure 5:
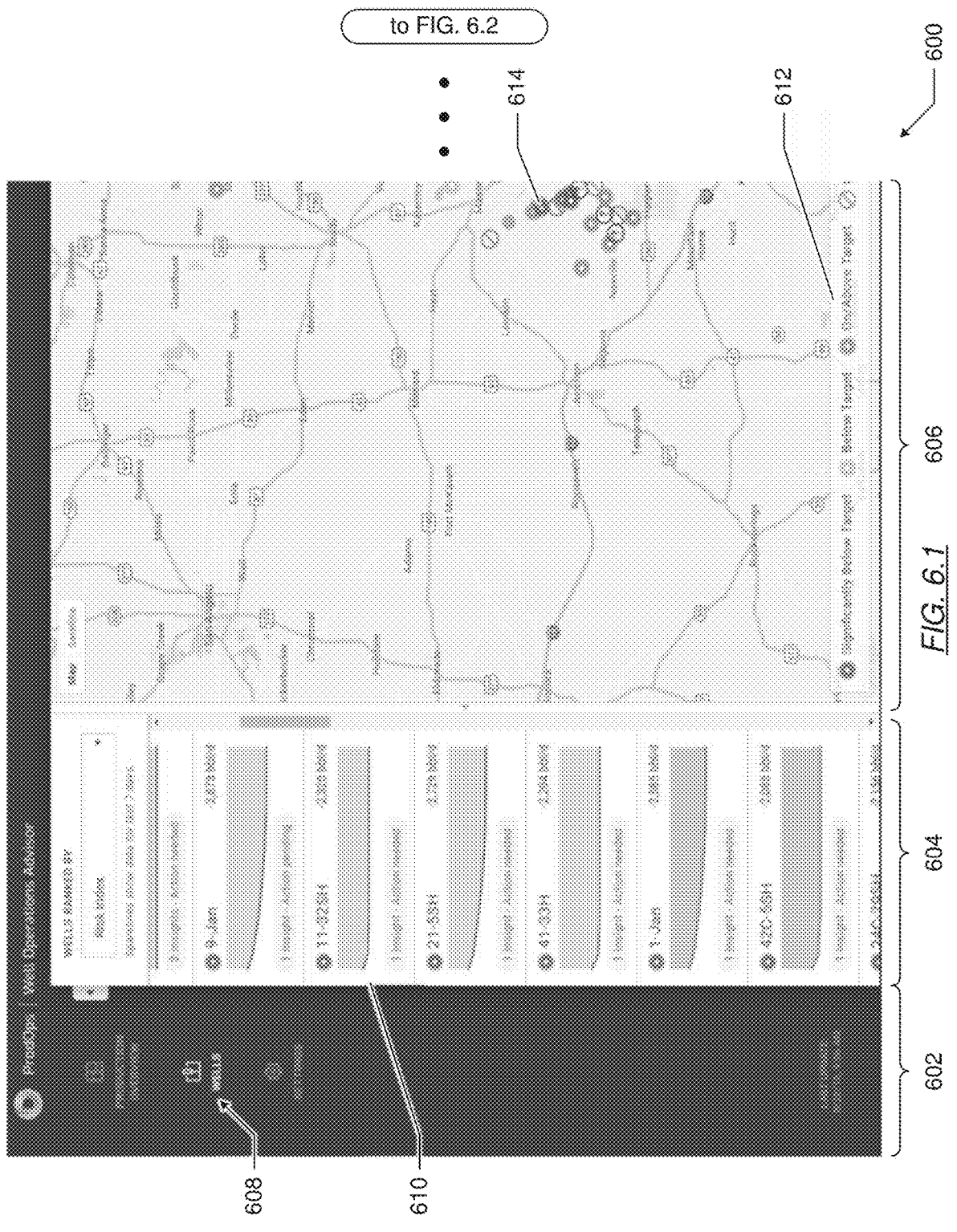

FIG. 5 shows a flowchart in accordance with one or more embodiments of the disclosure. While the various blocks in the flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

In Block 502, a root cause is identified. In one or more embodiments, a root cause is identified using one or more machine learning models that take well data as input, extract features, and apply a neural network to the features. The root cause may also be identified using domain models and local expertise. The well data may include hydrocarbon production, water production, geographic location, dates of production, dates of segments completion, etc. Features are extracted from the well data. For example, statistical methods may be used, such as generating average and standard deviation values for production.

In Block 504, a job is identified to address the root cause. In one or more embodiments, the job is identified using one or more machine learning models applied to the well data and the outputs from the machine learning models that identified a root cause.

In Block 506, features are extracted from the jobs for a machine learning model to generate the priorities. The features include an identifier of the jobs, resources for the jobs, wellsites involved, oilfield equipment at the wellsite affected by the job, value of any contracts affecting the wellsite, costs of missing production schedules, and other such attributes of the job. The features may include the well data, the outputs from the root cause identification machine learning model, the outputs from the job identification machine learning model, and additional features extracted from the other inputs. The priorities are for the jobs of the wells that are being analyzed by the system. The priorities are used to rank the jobs in an order that is used to assign resources to the jobs.

In Block 508, priorities are generated based on features using a machine learning model. In one or more embodiments, the machine learning model for generating priorities includes a neural network, such as a recurrent neural network. The neural network takes the features as inputs and outputs priorities for the jobs. The neural network includes an input layer, and output layer, and one or more hidden layer. Each layer includes multiple nodes, and each node has one or more parameters, such as a weight. In one or more embodiments, the machine learning model includes one or more programs that run on an E&P computer system that is operated by an E&P services provider. The E&P services provider may use one machine learning model for multiple clients or may use multiple machine learning models for multiple clients that use the E&P computer system with different machine learning models being customized for different clients.

In Block 510, user priorities are obtained. In one or more embodiments, the priorities are obtained by presenting priorities from the machine learning model to the user with a graphical user interface. The graphical user interface is manipulated by the user to change the priorities of the jobs and wells, such as by dragging and dropping the jobs to different rows of a table displaying the priorities, jobs, and wells.

In block 512, a machine learning model is updated based on user priorities. In one or more embodiments, backpropagation is used to update the weights of the nodes in the machine learning model accordingly to the priorities that were updated by the user. The goal of training the machine learning model is to learn the priorities that should be assigned to the jobs based on various features determined from the jobs. Thus, over time, the machine learning model learns single features or combination of features that affect the priority of the job.

In block 514, priorities are generated with an updated machine learning model. In one or more embodiments, the machine learning model that was updated by backpropagating the updated priorities is used to generate subsequent priorities for the same and additional jobs. The subsequent priorities are presented to the clients and users of the E&P computer system.

Figure 6:
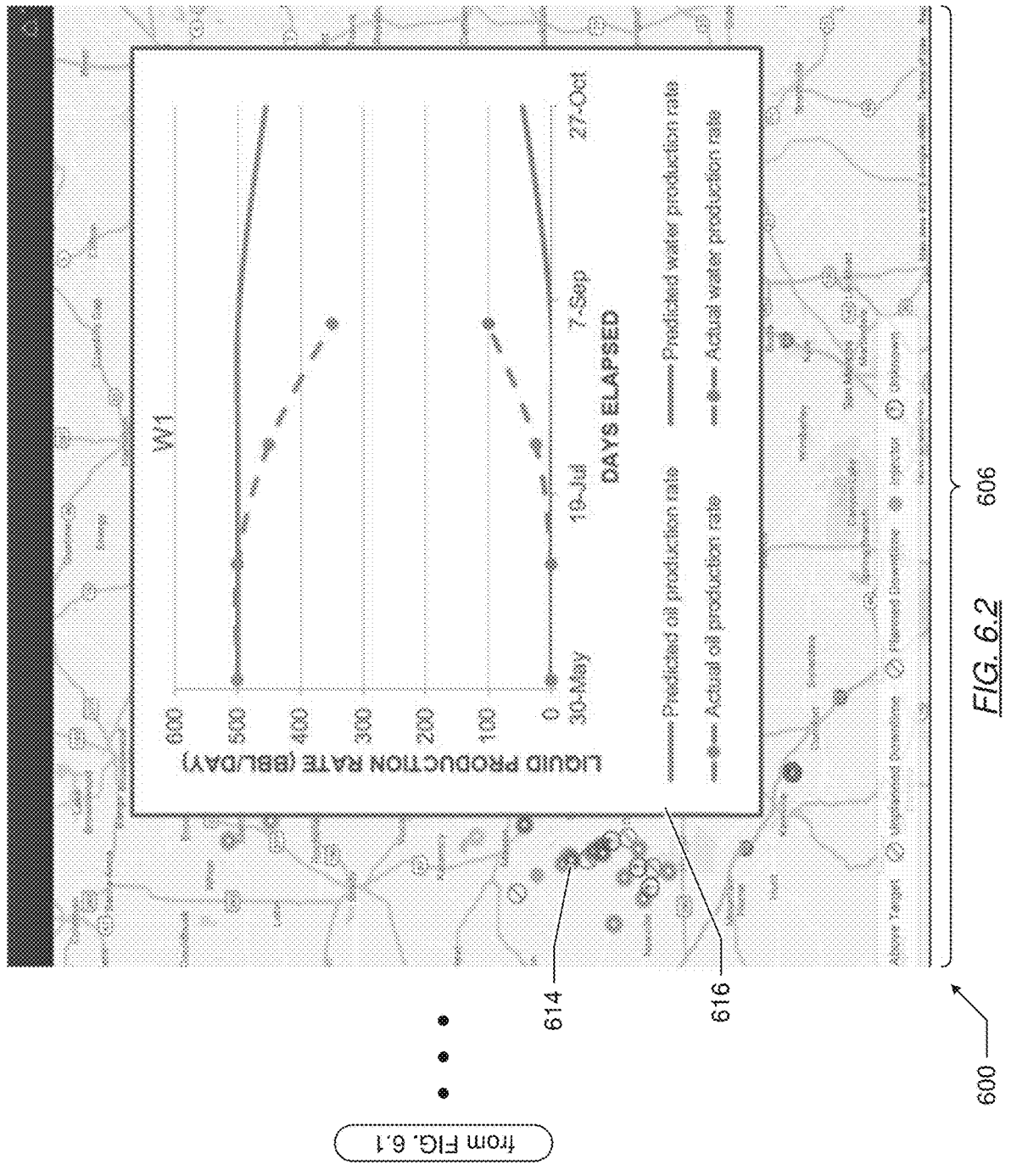
FIG. 6.1, FIG. 6.2.

FIGS. 6.1, 6.2, 7, 8, 9, and 10 show examples of graphical user interfaces in accordance with the disclosure. The various user interface elements shown in the graphical user interfaces of FIGS. 6.1, 6.2, 7, 8, 9, and 10 may be omitted, repeated, combined, and/or altered as shown from FIGS. 6.1, 6.2, 7, 8, 9, and 10 Accordingly, the scope of the present disclosure should not be considered limited to the specific arrangements shown in FIGS. 6.1, 6.2, 7, 8, 9, and 10.

Turning to FIGS. 6.1 and 6.2, the graphical user interface (600) is in accordance with embodiments of the disclosure. Referring to FIG. 6.1, the graphical user interface (600) includes a sidebar (602), an information window (604), and a map (606).

The sidebar (602) includes the wells icon (608). In one or more embodiments, selection of the wells icon (608) brings up the display of the information window (604).

The information window (604) displays information about the wells displayed in the map (606). As an example, the user interface element (610) is a list element that is part of a list of wells. The element (610) includes a status icon for the well, an identification of the well ("11-32SH"), the number of barrels per day that the production of a well is below expectations ("−2,320 bbl/d"), a graph of the well production, and a notification ("1 Insight-Action needed"). The status icon is a red annulus that corresponds with the legend (612) to indicate that the production for the well identified as "11-32SH" is significantly below target. The notification indicates that an action for the well identified as "11-32SH". In one or more embodiments, the list elements displayed in the information window (604) correspond to the wells marked on the map (606). In one or more embodiments, the well data displayed in the information window is gathered from the E&P computer system described in FIG. 1.

The map (606) is a geographical map that displays the locations of the wells. The map (606) includes the legend (612) and the marker (614).

The legend (612) describes the status icons used for the wells displayed in the information window (604) and the map (606). In one or more embodiments, the status icons include: a red annulus to indicate a well is significantly below target (FIG. 6.1), a yellow annulus to indicate that a well is below target (FIG. 6.1), a green annulus to indicate that a well is on or above target (FIG. 6.1), a red slashed circle to indicate that a well is experiencing unplanned downtime (FIG. 6.2), a dark blue slashed circle to indicate that a well is experiencing planned downtime (FIG. 6.2), a blue circle to indicate that a well is an injector (FIG. 6.2), and a circled question mark to indicate a well with an unknown status (FIG. 6.2).

Referring to FIG. 6.2, the graphical user interface (600) further includes the well information window (616). In one or more embodiments, the well information window (616) is displayed in response to selection of the marker (614), which corresponds to the element (610).

In one or more embodiments, the well information window (616) shows the predicted and actual oil production rates with the predicted and actual Water Production rates. As an example, the predicted and actual oil production rates are displayed in green starting at around 500 barrel per day around the 30th of May. The predicted and actual water production rates are displayed in blue starting at around 0 barrels per day around the 30th of May. The oil production rate was predicted to remain at around 500 barrels per day through around September 7th and the water production rate was predicted to remain at around 0 barrels per day through September 7th. However, around September 7th the actual oil production rate dropped below 400 barrels per day and the actual water production rate increased to around 100 barrels per day. In one or more embodiments, one or more of the unexpected decreases in oil production and the unexpected increase in water production trigger the display of the notification in the element (610).

Figure 7:
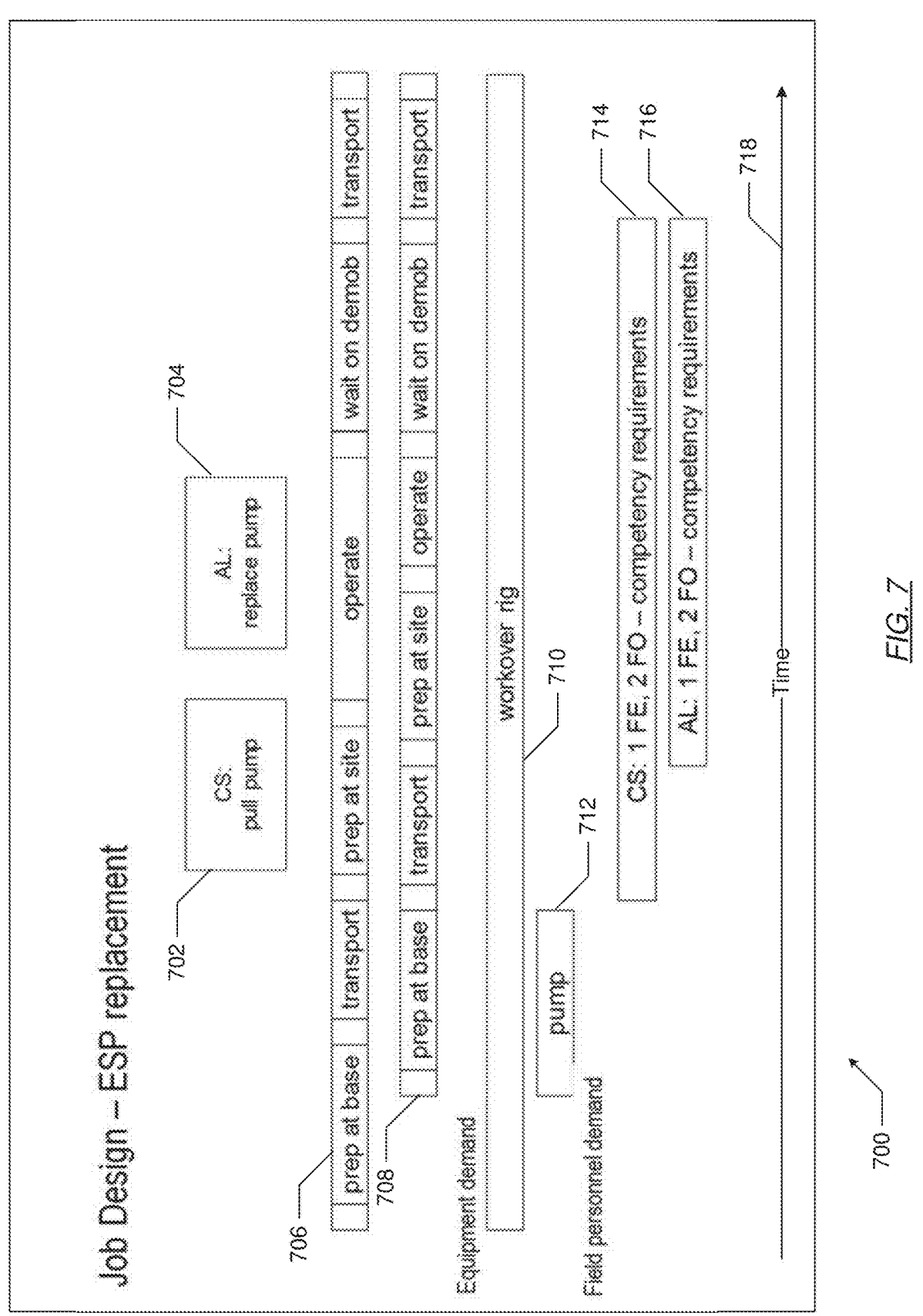
FIG. 7, FIG. 8, FIG. 9, and FIG. 10 show examples in accordance with disclosed embodiments.

Referring to FIG. 7, the graphical user interface (700) displays resources for a job for a well with the user interface elements (702) through (718). The job displayed in the graphical user interface (700) is for an electric submersible pump (ESP) replacement and includes pulling a pump and replacing a pump. Pulling an existing pump from the well displayed is displayed with the element (702). Replacing the pump with a new pump in the well is displayed with the element (704).

The element (706) displays a timeline of the activities for pulling the pump. The element (708) displays a timeline of the activities for replacing the pump. The timelines of the elements (706) and (708) provide relative indications of the amount of time estimated for the activities to pull the pump and replace the pump.

The element (710) displays the equipment to pull the pump, which includes a workover rig. The element (712) displays the equipment to replace the pump, which includes the new pump. The widths of the elements (710) and (712) indicate when the equipment for pulling the pump and replacing the pump is used. For example, the workover rig is used during the entire length of time for pulling the pump. In contrast, the pump (displayed with the element (712)) is used at the time that prepping at the base occurs for replacing the pump, which is identified in the element (708) as "prep at base".

The element (714) identifies the personnel for pulling the pump. The element (716) identifies the personnel for replacing and installing the pump. The element (714) combined with the alignment of the element (714) to the element (706) indicates that one field engineer and two field operators will be used to perform the preparation at the site ("prep at site" in the element (706)), perform operations at the site ("operate" in the element (706)), and wait on demobilization ("wait on demob" in the element (706)). The element (716) combined with the alignment of the element (716) to the element (708) indicates that one field engineer and two field operators will be used to perform the preparation at the site ("prep at site" in the element (708)), perform operations at the site ("operate" in the element (708)), and wait on demobilization ("wait on demob" in the element (708)).

The element (718) indicates that the horizontal axis of the graphical user interface (700) is proportional to time. In other words, the time of the use of the equipment goes from left to right. The element (718) indicates that the width of the user interface elements (706) through (716) are proportional to the length of time for the activities, equipment, and personnel usage indicated by the elements (706) through (716).

Figure 8:
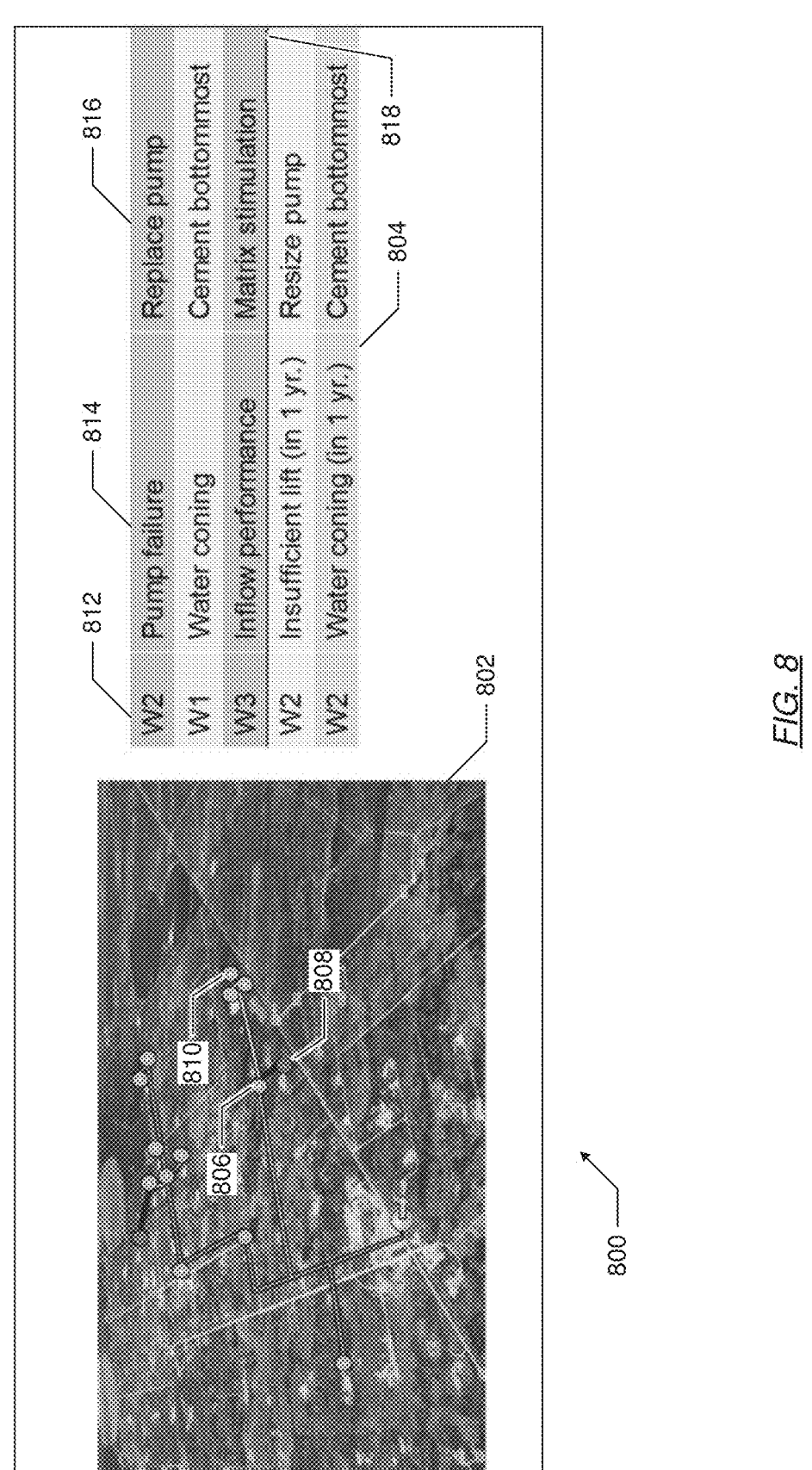

Referring to FIG. 8, The graphical user interface (800) displays an interface that presents and receives updates to the prioritization of wells, issues, and jobs. In one or more embodiments, the graphical user interface (800) is displayed in response to selecting a marker (e.g., the marker (614) of FIG. 6.1 and FIG. 6.2) displayed on the graphical user interface (600) of FIG. 6.1 and FIG. 6.2. The graphical user interface (800) includes the overhead map (802) and the table (804). With the graphical user interface (800), issues that are expected with a well at some point in the future are prioritized. The issues may be holistic and consider multiple pieces of equipment at a well or, for example, a reservoir issue like water coning, which is independent of equipment lifespan. The issues may also be related to a specific piece of equipment, such as the lifespan of the equipment that is defined by the manufacturer of the equipment.

The overhead map (802) displays an image from a satellite or aerial vehicle. The image is augmented to display wells with markers and connections between the wells. The markers (806), (808), and (810), correspond to the wells identified as well "W1", well "W2", and well "W3" in the table (804). In one or more embodiments, selecting a marker from the map (802) selects the corresponding well in the table (804).

The table (804) is a tabular display of the wells, issues, and jobs of one or more of the wells displayed in the map (802). The rows of the table (804) identify groupings of a well, an issue, and a job to address the issue. The data in the rows is split among the columns (812) through (816). The column (812) identifies a well, the column (814) identifies an issue with the well, and the column (816) identifies a job to address the issue. Rows may also have different priorities based on the order within the table (804). In one or more embodiments, the rows may be dragged and dropped to change the order of the rows in the table (804) and the corresponding priorities of the jobs in the table (804).

In one or more embodiments, the table (804) includes a dividing line (818). The dividing line (818) separates the table (804) between the third and fourth rows. In one or more embodiments, the dividing line separates shorter term issues from longer term issues. As an example, shorter term issues that are to be attended to within the next 30, 60, or 90 days and longer term issues that are to be attended to in the next year. Rows on different sides of the dividing line 818 may have different priorities.

Figure 9:
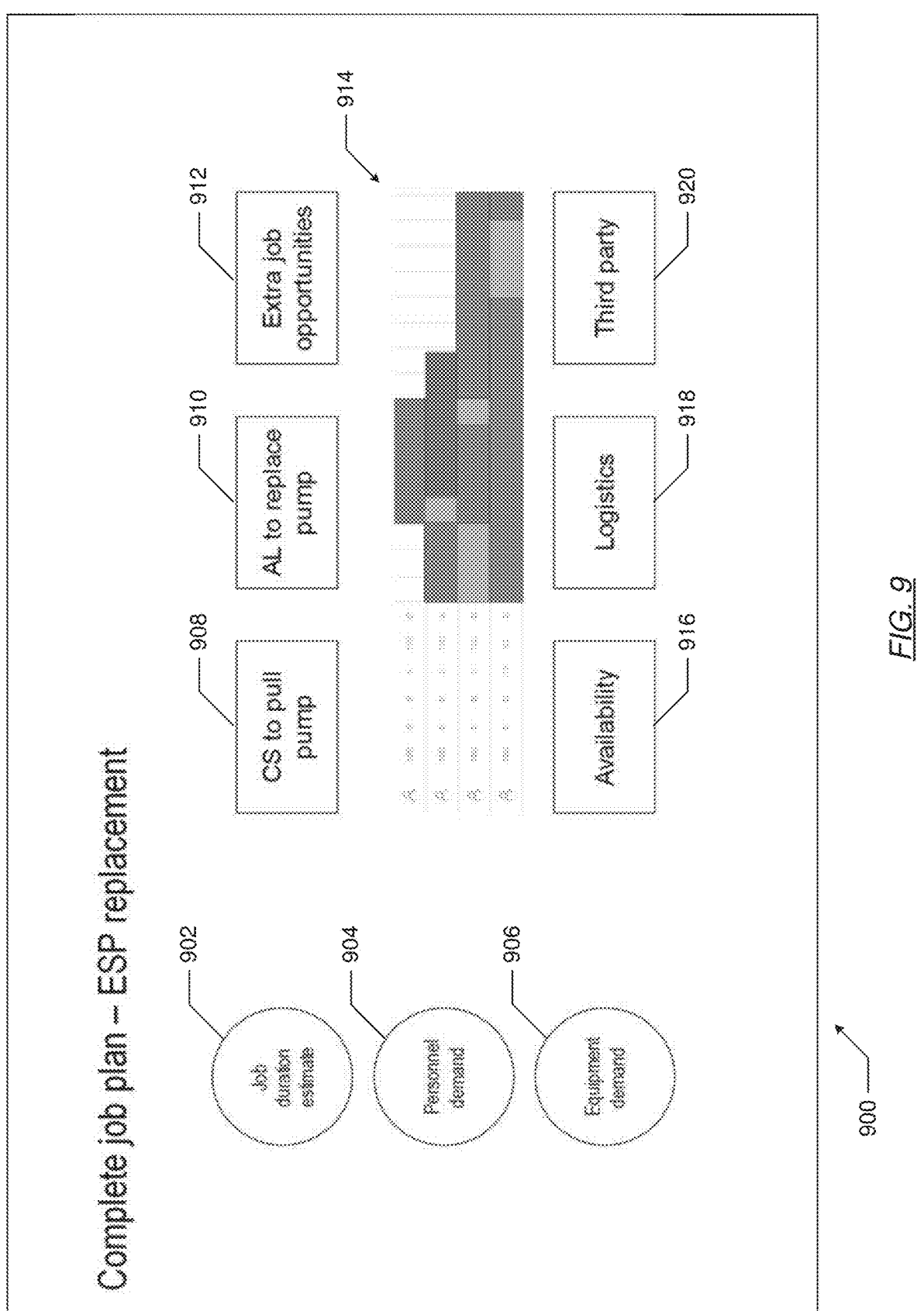

Referring to FIG. 9, the graphical user interface (900) presents and obtains a schedule for resources for a job. The graphical user interface (900) includes the user interface elements (902) through (920).

The elements (902) through (906) identify different parts of a job plan for the job displayed with the graphical user interface (900). The element (902) identifies a first section of the graphical user interface (900) for job duration estimates. The element (904) identifies a second section of the graphical user interface (900) for personnel demand. The element (906) identifies a third section of the graphical user interface (900) for equipment demand.

In one or more embodiments, interacting (e.g., hovering, selecting, clicking, tapping, etc.) with the element (902) enables interaction with the elements (908) through (912). In one or more embodiments, selecting the element (908) brings up a user interface element that includes an estimate of the duration for the length of time used to pull a pump; selecting the element (910) brings up a user interface element that includes an estimate of the duration for the length of time used to replace a pump; and selecting the element (912) brings up a user interface element that lists extra job opportunities that may be included in the job and that lists duration estimates for the extra job opportunities.

In one or more embodiments, interacting with the element (904) enables interaction with the element (914). The element (914) is a table of timelines that includes multiple rows. One row corresponds to one person for the job. A row includes an icon for the person, a set of productivity metrics for the person, and a visual depiction of the availability of the person over several days, shown as an availability timeline. In one or more embodiments, the table in the element (914) may scroll vertically for more personnel and the availability timeline in the table may scroll horizontally independently of the other columns of the table in the element (914).

In one or more embodiments, interacting with the element (906) enables interaction with the elements (916) through (920). In one or more embodiments, selecting the element (916) brings up a user interface element that shows a list of equipment that is available and will be used to perform the job. The equipment may be selected from the list to be used on the job.

In one or more embodiments, selecting the element (918) brings up a user interface element that schedules the logistics for the equipment selected from the list of equipment. Scheduling the logistics includes scheduling the time when the equipment will be prepared, transported, and operated for the job.

In one or more embodiments, selecting the element (920) brings up a user interface element that lists equipment available from third parties. In some cases, equipment that is for the job may not be available and equipment that is provided by a third party may be used for the job. In one or more embodiments, the user interface element displayed in response to selecting the element (920) identifies the third parties and the equipment available from the third parties for the job.

Figure 10:
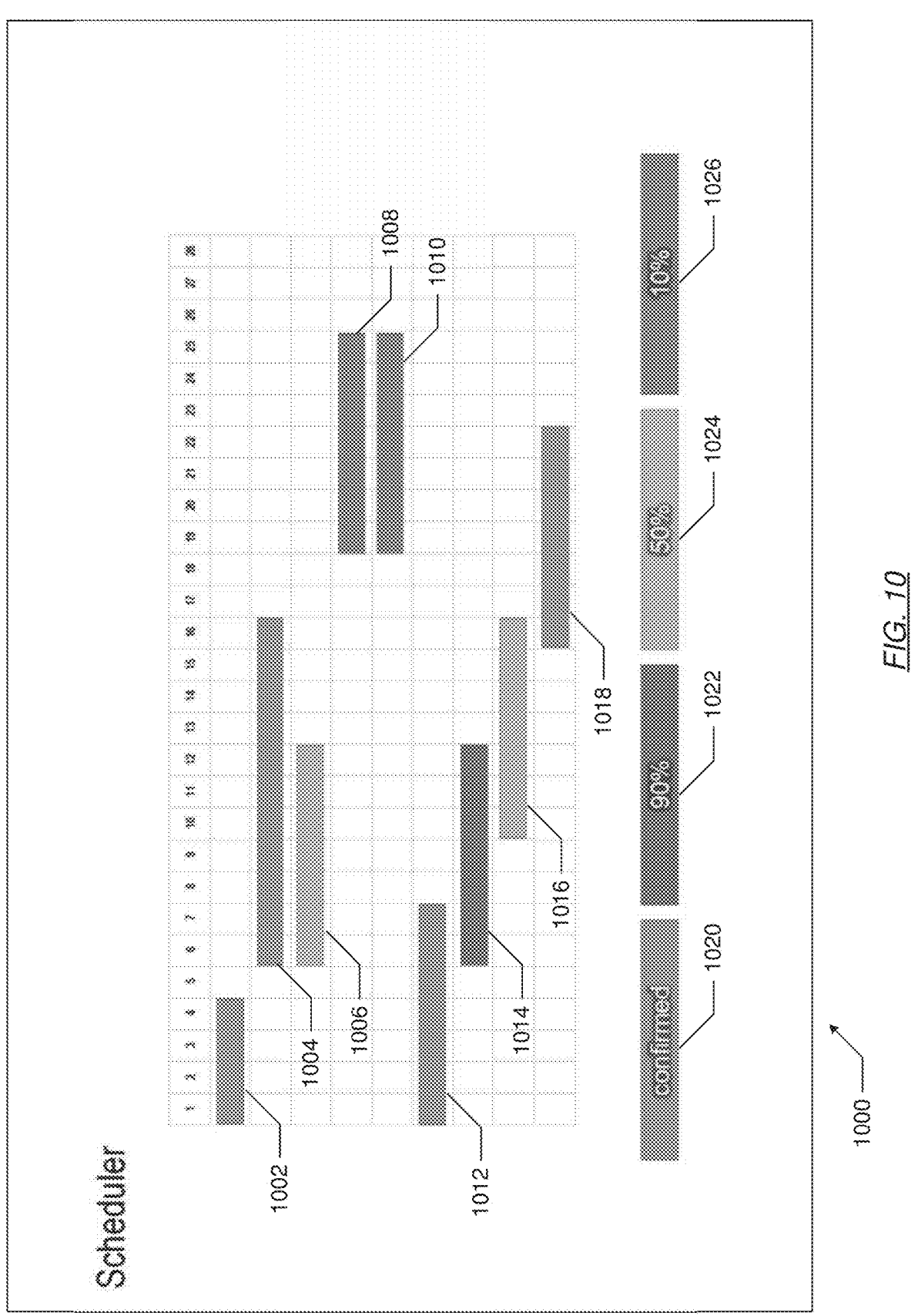

Referring to FIG. 10, the graphical user interface (1000) displays a master job schedule that includes multiple jobs for multiple wells. The master job schedule presented with the graphical user interface (1000) is used by the E&P services provider to schedule resources for jobs. The master job schedule is used to schedule and handle job requests for clients and identifies when jobs are scheduled and the probability that a client will request a job that has been identified by the system to be performed. The job schedule includes the user interface elements (1002) through (1026).

The elements (1002) through (1018) represent jobs scheduled during the time frame displayed on the graphical user interface (1000). As an example, the element (1004) may represent the job displayed in the graphical user interface (900) of FIG. 9.

The elements (1020) through (1026) are legend elements of a legend for the job schedule. The legend elements identify whether a job has been confirmed. A job has a corresponding confirmation probability that indicates the expectation that a job will be confirmed by a client of the E&P services provider, and may also be referred to as a client confirmation probability. A job that has been confirmed will likely be performed and may have a confirmation probability of 100%. Jobs that have not been confirmed have a confirmation probability that is less than 100%. As an example, the legend includes element (1020) for jobs that are confirmed ("confirmed") and are colored green; element (1022) for jobs with around a 90% expectation of confirmation and are colored blue; element (1024) for jobs with around a 50% expectation of confirmation and are colored yellow; and element (1026) for jobs with around a 10% expectation of confirmation and are colored orange.

The jobs represented by the elements (1002), (1004), (1012), and (1018) have confirmation probabilities of 100%, are colored green, and will be performed. The job represented by the element (1014) has a confirmation probability of around 90% and is colored blue. The jobs represented by the elements (1006) and (1016) have confirmation probabilities of around 50% and are colored yellow. The jobs represented by the elements (1008) and (1010) have confirmation probabilities of around 10% and are colored orange.

The jobs represented by the elements (1008) and (1010) may have a low confirmation probability because of a lack of resources available for the job and because of a determination that the client (for whom the job will be performed by the E&P services provider) has a low probability of requesting the job be performed based on historical data about the client.

In the case of a lack of resources, a user of the system may identify different resources (e.g., third party resources) that are to be included in the scheduling and may adjust the job priorities in the table (804) from FIG. 8. When an adjustment is made to the priorities, the system may redo the scheduling of the resources for the jobs to include the third party resources and update the display of the job schedule in the graphical user interface (1000). The updates may yield an increase in the confirmation probability for one or more of the jobs based on the additional use of third party resources and the adjustments to the priorities. Additionally, when an adjustment is made it to the priorities of the jobs, the system may record the adjustments and use the adjustments to update a machine learning model that automatically generates the priorities in the table (804) prior to user adjustments.

Analysis of historical data for clients identifies which clients are quick to agree with and decide on the solutions and jobs proposed by the E&P services provider. Analysis of historical data for clients also identifies which clients are less responsive and more retroactive. As an example, jobs for clients that agree within 30 days to do the jobs suggested by the E&P services provider more than 90% of the time have a higher likelihood of being colored green. Clients that wait until after 90 days before agreeing to do the jobs suggested by the E&P services provider have a higher likelihood of being colored yellow or orange.

Embodiments may be implemented on a computing system. Any combination of mobile, desktop, server, router, switch, embedded device, or other types of hardware may be used. For example, as shown in FIG. 11.1, the computing system (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), and numerous other elements and functionalities.

The computer processor(s) (1102) may be an integrated circuit for processing instructions. For example, the computer processor(s) may be one or more cores or micro-cores of a processor. The computing system (1100) may also include one or more input devices (1110), such as a touchscreen, keyboard, mouse, microphone, touchpad, electronic pen, or any other type of input device.

The communication interface (1112) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (1100) in FIG. 11.1 may be connected to or be a part of a network. For example, as shown in FIG. 11.2, the network (1120) may include multiple nodes (e.g., node X (1122), node Y (1124)). Nodes may correspond to a computing system, such as the computing system shown in FIG. 11.1, or a group of nodes combined may correspond to the computing system shown in FIG. 11.1. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (1100) may be located at a remote location and connected to the other elements over a network.

Although not shown in FIG. 11.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system shown in FIG. 11.1. Further, the client device (1126) may include and/or perform at least a portion of one or more embodiments of the disclosure.

The computing system or group of computing systems described in FIGS. 11.1 and 11.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 11.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 11.1, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B may compare the first element of vector A with the first element of vector B, the second element of vector A with the second element of vector B, etc. In one or more embodiments, if A and B are strings, the binary values of the strings may be compared.

The computing system in FIG. 11.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 11.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type.

Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 11.1 and the nodes and/or client device in FIG. 11.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method implemented by at least one data processor having processor-implemented instructions, the method comprising:

using a machine learning model to determine when an issue related to one or more wellsites will occur prior to the issue related to the one or more wellsites occurring;

using the machine learning model to determine a set of priorities corresponding to a set of jobs to address the issue related to the one or more wellsites, prior to the issue related to the one or more wellsites occurring, wherein each job of the set of jobs comprises a defined set of tasks to modify equipment at the one or more wellsites, wherein the machine learning model determines a priority for a given job of the set of jobs based on features of the given job;

receiving user priorities corresponding to the set of jobs to address the issue related to the one or more wellsites;

retraining the machine learning model based on the user priorities corresponding to the set of jobs to address the issue related to the one or more wellsites;

using the retrained machine learning model to determine an updated set of priorities corresponding to the set of jobs to address the issue related to the one or more wellsites;

generating a job schedule for the set of jobs to address the issue related to the one or more wellsites, wherein the job schedule is generated using the updated set of priorities; and sending resources to the one or more wellsites based on the generated job schedule prior to the issue related to the one or more wellsites occurring.

2. The method of claim 1, further comprising, presenting a user interface that includes the job schedule, wherein the user interface is configured to enable a user to update the job schedule and update the set of priorities corresponding to the set of jobs of the job schedule, by user input that reorders the set of jobs as presented by the user interface to adjust the priorities for the set of jobs.

3. The method of claim 2, further comprising, using user interaction with the user interface to partially update the machine learning model.

4. The method of claim 1, further comprising, generating an additional set of priorities corresponding to a second set of jobs to address a second issue related to the one or more wellsites based on the retrained machine learning model.

5. The method of claim 4, further comprising:

using the additional set of priorities to generate an additional job schedule for the second set of jobs to address the second issue related to the one or more wellsites; and sending additional resources to the one or more wellsites based on the additional job schedule prior to the second issue related to the one or more wellsites occurring.

6. The method of claim 2, wherein the user interface is further configured to present the job schedule with a set of client confirmation probabilities corresponding to the set of jobs.

7. The method of claim 6, wherein the set of client confirmation probabilities are based on the resources available for the set of jobs.

8. The method of claim 6, wherein the set of client confirmation probabilities are based on historical data from respective clients.

9. A system comprising:

a server with a memory coupled to a processor; and the memory comprising an operations framework, wherein the operations framework executes on the processor, uses the memory, and is configured to:

use a machine learning model to determine when an issue related to one or more wellsites will occur prior to the issue related to one or more wellsites occurring;

use the machine learning model to determine a set of priorities corresponding to a set of jobs to address the issue related to the one or more wellsites, wherein each job of the set of jobs comprises a defined set of tasks to modify equipment at one or more wellsites, wherein the machine learning model determines a priority for a given job of the set of jobs based on features of the given job;

receive user priorities corresponding to the set of jobs to address the issue related to the one or more wellsites;

retrain the machine learning model based on the user priorities corresponding to the set of jobs to address the issue related to the one or more wellsites;

use the retrained machine learning model to determine an updated set of priorities corresponding to the set of jobs to address the issue related to the one or more wellsites;

generate a job schedule for the set of jobs to address the issue related to the one or more wellsites, wherein the job schedule is generated using the updated set of priorities; and send resources to the one or more wellsites based on the generated job schedule.

10. The system of claim 9, wherein the operations framework is further configured to present a user interface that includes the job schedule, wherein the user interface is configured to enable a user to update the job schedule and update the set of priorities corresponding to the set of jobs of the job schedule, by user input that reorders the set of jobs as presented by the user interface to adjust the priorities for the set of jobs.

11. The system of claim 10, wherein the operations framework is further configured to use user interaction with the user interface to partially update the machine learning model.

12. The system of claim 9, wherein the operations framework is further configured to generate an additional set of priorities corresponding to a second set of jobs to address a second issue related to the one or more wellsites based on the retrained machine learning model.

13. The system of claim 12, wherein the operations framework is further configured to send additional resources to the one or more wellsites based on a second generated job schedule prior to the second issue related to the one or more wellsites occurring.

14. The system of claim 12, wherein the operations framework is further configured to:

receive user priorities corresponding to the second set of jobs to address the second issue related to the one or more wellsites;

train the machine learning model to generate a further retrained machine learning model based on the user priorities corresponding to the second set of jobs to address the second issue related to the one or more wellsites;

use the further retrained machine learning model to determine an additional updated set of priorities corresponding to the second set of jobs to address the second issue related to the one or more wellsites;

use the additional updated set of priorities to generate a second job schedule for the second set of jobs to address the second issue related to the one or more wellsites; and send additional resources to the one or more wellsites based on the second job schedule prior to the issue related to the one or more wellsites occurring.

15. The system of claim 9, wherein the operations framework is further configured to send resources to the one or more wellsites based on the generated job schedule at the time the issue related to the one or more wellsites occurs.

16. The system of claim 14, wherein the operations framework is further configured to send additional resources to the one or more wellsites based on the updated second job schedule at the time the issue related to the one or more wellsites occurs.

\* \* \* \* \*